Figure 1:
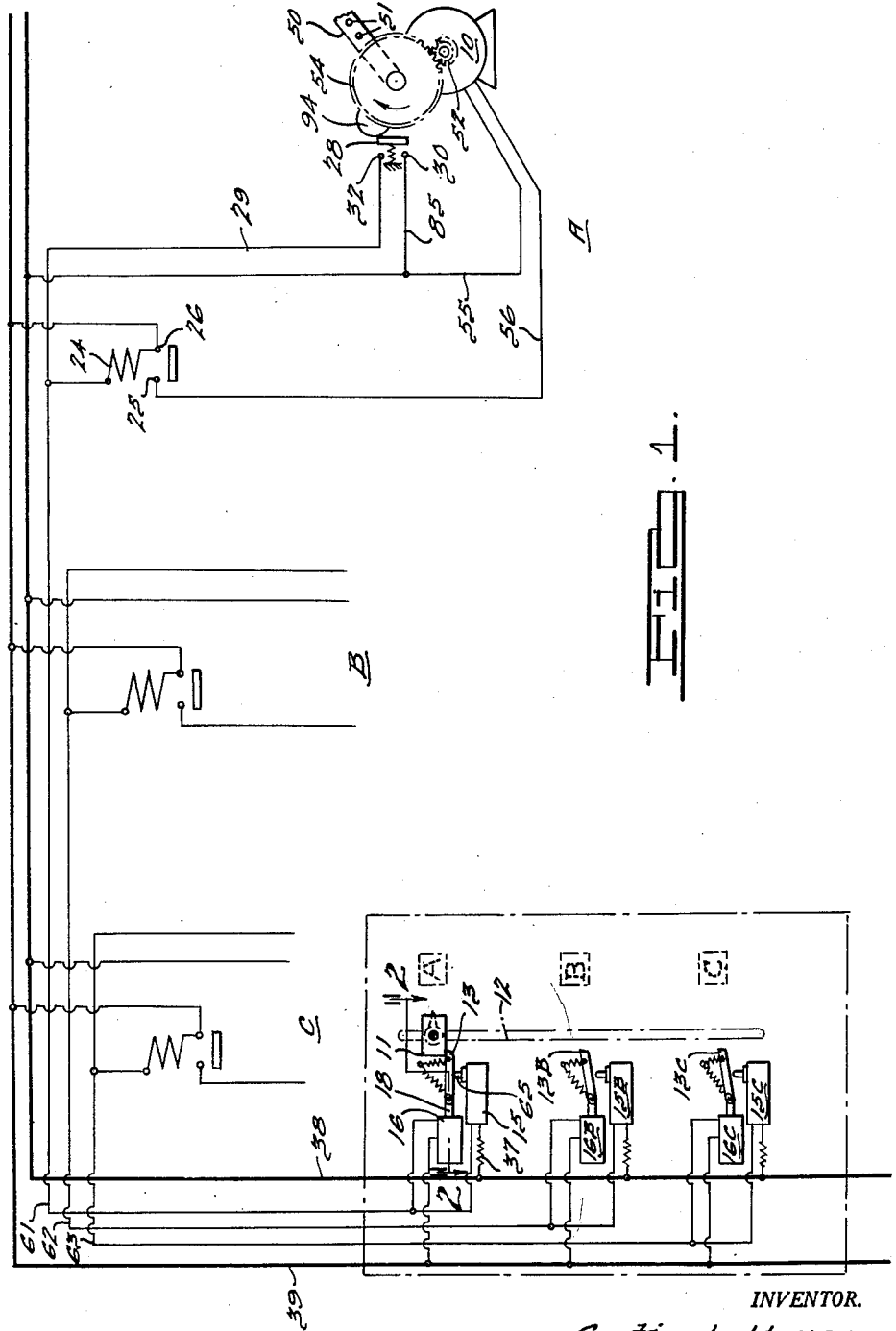

Oct. 31, 1950 C. L. HOWSE 2,528,434
ELECTRICAL CONTROL SYSTEM
Filed Aug. 24, 1948 2 Sheets-Sheet 1

INVENTOR.
Curtis L. Howse.
BY
Harness, Dickey & Pierce
ATTORNEYS.

Oct. 31, 1950          C. L. HOWSE          2,528,434
ELECTRICAL CONTROL SYSTEM

Filed Aug. 24, 1948                   2 Sheets-Sheet 2

INVENTOR.
Curtis L. Howse.
BY
Harness, Dickey & Pierce
ATTORNEYS

Patented Oct. 31, 1950

2,528,434

UNITED STATES PATENT OFFICE 2,528,434

ELECTRICAL CONTROL SYSTEM

Curtis L. Howse, Spartanburg, S. C., assignor to Diamond Power Specialty Corporation, Detroit, Mich., a corporation of Michigan Application August 24, 1948, Serial No. 45,865

8 Claims. (Cl. 318—102)

The present invention relates to electrical control systems. Although disclosed in connection with, and particularly suitable for, the control of a plurality of rotary soot blowers for cleaning heat-exchanging surfaces such as the internal parts of water tube boilers, the invention is also readily applicable to other uses involving the control of electrical components from a remote point.

It is an important object of the present invention to provide an improved electrical controlling system of the indicated character incorporating a control station from which the action of a plurality of remotely located controlled devices may be supervised, either automatically or manually, the arrangement being such that control apparatus at the control station may function to automatically start and stop the controlled apparatus or otherwise regulate its functioning in any desired or predetermined sequence, the sequence being variable or changeable at any time in a quick and simple manner by an operator at the control station.

Another object is to provide such an electrical control system of extremely flexible, simple and reliable character and which requires the provision of only one special connecting wire from the control station to each piece of controlled apparatus.

Still another object is to provide such an improved control system incorporating means whereby a plurality of soot blowers or other controlled devices may be so activated that each controlled device starts at a desired time, performs a predetermined cycle of operations, and then stops, while other controlled devices are similarly started and stopped in desired sequential relation.

Other objects and advantages will be apparent upon consideration of the present disclosure in its entirety.

Figure 2:
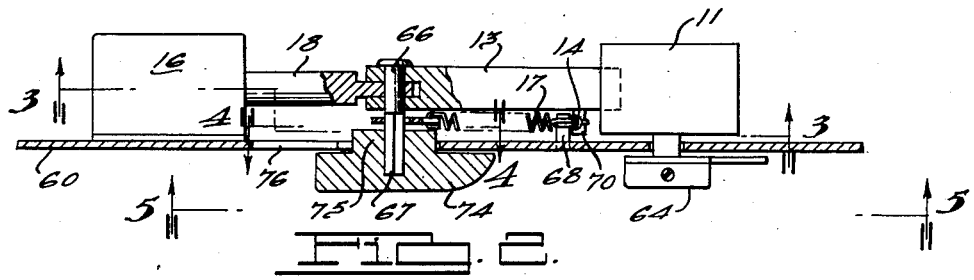
Figure 3:
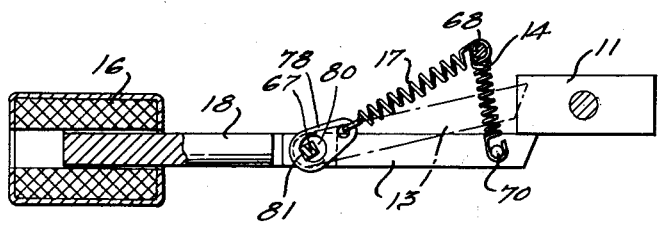
Figure 4:
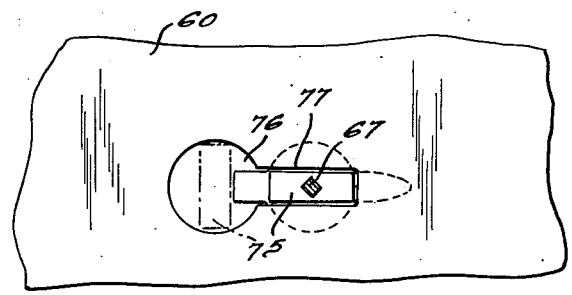
Figure 5:
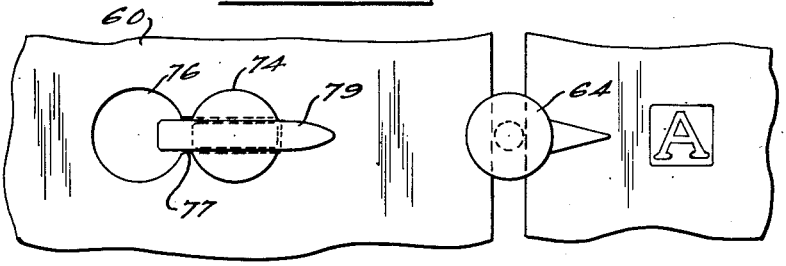

In the drawings:

Figure 1 is a schematic diagram of a control system incorporating the principles of the present invention;

Figure 2 is a horizontal sectional view taken substantially on the line 2—2 of Fig. 1 and looking in the direction of the arrows; and Figures 3, 4 and 5 are sectional elevational views taken substantially on the lines 3—3, 4—4, and 5—5 respectively of Fig. 2.

Referring now to the drawings, reference characters 38 and 39 designate a pair of electrical conductors which may be connected to a suitable source of alternating current supply, for example, a 220-volt single-phase source. In the illustrative soot-blower system depicted diagrammatically in Fig. 1 as representative of a system the action of which is adapted to be regulated by means of my improved controlling system, it is presumed that three rotary soot-blower heads are to be controlled. Although a larger number would of course actually be used in most commercial boiler installations, the principles of operation are the same. Each blower unit includes a blower tube 50 having steam-discharging orifices as 51 therein and rotatable by an electric motor as 10 which drives the blower tube through reduction gearing represented by a pinion 52 and gear 54. The details of construction of the blower-head assembly are not further illustrated or considered herein, since they form no part of my present invention, and might in fact vary widely. Suitable blowers of the indicated variety are well known in the art. The blower tube 50 and driving motor 10 therefor are only indicated in conjunction with one of the controlled blower-head assemblies or stations, generally designated A, but the electrical motor controlling components for three such blower-head stations are shown, the other stations being designated B and C. Since the stations are alike, description of station A only will suffice. It will be understood that at each station the motor controlling components may be and preferably are located adjacent the blower-head driving motor.

Considering the components of controlled blower-head station A, the electric blower rotating motor 10 has one lead as 55 connected to one of the supply conductors as 38, the other motor lead as 56 being connected to the other supply conductor 39 through the contacts 25, 26 of a magnetic contactor the action of which is supervised from a remotely located supervisory or program control station, represented generally by the reference numeral 60, which is applied in Fig. 1 to the program control panel.

The program control panel is a central controlling point for all stations, and the system is so arranged that only a single special conductor is required from the program control panel to each such controlled station. The three special control wires leading to the three controlled units shown in the representative system depicted in Fig. 1 are designated 61, 62, and 63 respectively. In series with each such conductor is a switch as 15 which is of the normally open single pole, single throw type and may conveniently be of the type commercially available under the trade name "Microswitch." A resistor as 37 is also incorporated in series with each such switch so that each control wire carries a dropped voltage when its control switch is closed. These resistors may be proportional to cut the voltage by about one-half. The other terminal of each control switch is individually connected to the conductor 61, 62 or 63 extending to its controlled station.

The control panel 60 is provided with a vertical slot 12 which serves to guide and retain a weight 11 arranged behind the panel but vertically movable by hand when desired from a position in front of the panel through the agency of a knob 64 which also serves as an indicator as to the position of the weight. The switches 15, 15B, 15C for the several controlled units are mounted upon the rear face of the panel in vertically spaced relation and arranged relatively close to and at uniform distances from the slot 12. The switches are actuatable by the weight 11. A latch piece as 13 overlies the actuating plunger at 65 of each switch. The weight of the latch piece alone is insufficient to actuate its switch to the closed circuit position against the effort of its internal spring means (unshown) which yieldably urges the switch to open circuit position. Such internal spring means may be augmented by a tension spring 14 acting upwardly upon the latch piece. When the weight 11 rests upon the latch piece, it closes the appurtenant switch. Latch piece 13 is pivotally attached at its opposite end to the horizontally slidable armature core as 18 of a solenoid 16, and a second tension spring 17 reacts longitudinally upon the armature 18 in a direction tending to pull the armature and latch piece 13 outwardly to a position such that the outer end of the latch piece lies in the path of the weight 11. Spring 17 may be attached at one end to the pivot pin 66 which connects the latch piece 13 to the armature 18, the other end of the spring 17 being attached to a fixed pin 68 which also serves as an anchor for the spring 14. The pin 68 may be carried by the control panel 60 at a point above the latch piece 13 and near the outer end thereof, the lower end of the spring 14 being hooked over a pin 70 projecting rearwardly from the back face of the latch piece, so that the spring 14 tends to rock the latch piece upwardly to the angular position shown as 13C in Fig. 1 and in dotted lines in Fig. 3. In such angular position, with the solenoid de-energized, the nose of the latch piece still projects far enough toward the slot to lie beneath the path of movement of the weight 11, so that if the weight falls upon such angularly disposed latch piece it forces the same downwardly against the plunger 65 and closes the appurtenant control switch, the weight of the part 11 being sufficient to maintain the switch closed. The nose of the latch piece may be inclined as indicated at 72 to facilitate moving the weight upwardly past the nose of the latch piece when the weight is lifted by means of the knob 64. As the weight is thus moved upwardly past a given latch piece, such latch piece is simply raised about its pivot and swings out of the way sufficiently to allow the weight to pass, whereafter it drops sufficiently to again lie in the path of the weight.

The pivot pin 66, which serves to articulate the latch piece 13 and armature 18, projects outwardly through a horizontal keyhole-shaped opening in the panel 60 and carries fast thereupon a knob 74. The knob is formed with an inwardly projecting hub portion 75 which is of narrow elongated form, shown as substantially rectangular, and which is adapted to travel transversely of the panel 60 in the keyhole-shaped opening when the solenoid 16 is energized. When the hub portion 75 is in the narrow portion 77 of the keyhole-shaped opening, it keys the knob 74 against rotation, while when the armature is drawn into the solenoid, the hub portion 75 moves into the enlarged and substantially circular portion 76 of the keyhole-shaped opening, and the knob may then be turned to rotate the hub portion 75 to vertical position, in which position it prevents the solenoid and latch piece from again moving outwardly, and maintains the latch piece in a position far enough to the left so that it does not interfere with free vertical movement of the weight 11. The knob 74 may be formed with an integral pointer section 79 to provide an indication as to the angular position of the hub portion 75.

Frictional detent means may also be provided to yieldably maintain the positioning of the knob 74 and the connected lock-out hub portion 75. The detent means is shown as comprising a spring abutment plate 78 serving to connect the lower end of the spring 17 to the pin 66 and having a pierced opening 80 loosely encircling the pin between the panel and the latch piece 13, the plate 78 having the opening 80 therein formed with a straight side 81 opposite its end to which the spring 17 is connected, the portion of the pin 66 encircled by the plate 78 being of square cross section. The flat side 81 of the opening 80 in the connecting plate 78 is constantly drawn against one of the flat sides of the square portion 67 of pin 66 and so tends to yieldably maintain the knob 74 and connected hub portion 75 in either the vertical or horizontal position.

The actuating solenoid 24 for the motor controlling contactor means is designed to be fully energized, to close the contacts 25, 26 in response to the half voltage fed thereto through conductor 61 when switch 15 is closed. This will be seen to energize the motor 10, which is thereby connected to full voltage feed lines 38, 39.

A limit switch actuatable by the controlled blower head is formed with a contact bar 28 which is adapted to engage and close a circuit between a pair of contacts as 30, 32. Contact 30 is connected to the full voltage power supply line 38 by a conductor 85, while contact 32 is connected by means of conductor 29 to the control line 61. The contact bar 28 is actuatable to closed circuit position by a cam lobe 94 rotatable coaxially with the gear 54 and blower element 50. When the cam lobe is in engagement with the contact bar, the contact bar closes the connection between the contacts 30, 32. When the cam lobe is away from full engagement with the contact bar, a spring 96 acting upon the bar moves it away from the contacts to open the circuit.

The solenoid 16 does not generate sufficient flux when supplied with the half voltage delivered by way of resistor 37 to actuate the connected latch piece 13. When the switch as 15 is initially closed, therefore, contacts 30, 32 being open, the switch 15 is held closed by the effect of the weight 11 upon the latch piece 13, so that the reduced voltage is fed to solenoid 24, which as stated is designed to be effectively energized by this reduced voltage. Solenoid 24 immediately closes the circuit to motor 10. This is the start of the operating cycle, which occurs with the cam lobe slightly past the position in which it closes contacts 30, 32, so that these contacts are open and motor 10 accordingly commences to turn blower element 50. The blower element is supplied with steam or air, or a mixture of these, or other suitable cleaning agency, through means well known in the art and not necessary to be described, since such features form no part of my present invention. It will also be recognized by those skilled in the art that it is desirable to cause the blower unit 50 to execute one full revolution and then stop, although blowing may take place through the entire revolution or through only a portion thereof. The motor continues to turn until the cam lobe 94, nearing completion of a full revolution, re-engages the bar 28, moving the same to the left, as the parts are viewed in Fig. 1, and resultantly closing the contacts 30, 32. Closure of these contacts applies full voltage to the conductor 61 from the full voltage feed line 38 by way of conductor 85, contacts 30, 32 and conductor 29, and the full operative voltage is resultantly applied to the solenoid 16, which immediately withdraws the latch 13, allowing it to swing upwardly and opening switch 15. Double voltage is accordingly also applied to the solenoid 24 for a short interval, but as soon as the cam 94 rotates away from the contact bar 28, contacts 30, 32 are opened, and switch 15 having previously opened, the line 61 is now dead and solenoid 24 is de-energized, whereupon the motor stops with the parts ready for subsequent operation.

The weight 11, freed by withdrawal of the upper latch piece, falls and strikes the next latch piece, as 13B, closing the switch 15B to initiate operation of the control unit B, the functioning of which may correspond to the functioning of the control unit A, just considered. It will be recognized that if the operator does not desire the unit B to function, he may merely lock the latch piece out of the path of the weight 11 by drawing it back through the agency of the knob 74, and turning the knob to the vertical position in the manner previously described. The weight in such event would skip the latch piece 13B, and the blower unit connected to control unit B would not then be activated, the weight striking and closing the next latch piece in position, comprising the latch piece 13C, as shown in the drawings.

It will also be apparent that any desired number of blower units may be controlled in the same manner, and that various other modifications and changes may be introduced without departing from the fair and intended scope of the subjoined claims.

What is claimed is:

1. Means for controlling an electric motor from a remote point including a pair of feed lines adapted to be connected to a source of electrical energy, control switching means and controlled motor means remote from one another, means including an electromagnetic controlling actuator appurtenant the control switching means for actuating said control switching means, motor switching means, a second electromagnetic actuator for actuating such motor switching means, said electromagnetic actuators each having one terminal connected to one of said feed lines and the second actuator being operable at lower potential than the controlling actuator, a voltage reducing element, each of said actuators having another terminal connected through said control switching means and through said voltage reducing element to the other of said feed lines, whereby the control switching means is effective to energize the second actuator through the voltage reducing element but cannot so operatively energize the controlling actuator due to the voltage reducing effect of said voltage reducing element, and a limit switch operatively interconnected with said motor and actuatable thereby to connect the said other terminal of the controlling actuator to said other feed line independently of said voltage reducing element and thereby apply full voltage to the controlling actuator to actuate said control switching means.

2. Means as set forth in claim 1 wherein said actuators and control switching means are connected to a common control conductor adapted to be supplied with reduced voltage through said voltage reducing element, said limit switch being connected to said reduced voltage conductor and to the other feed line.

3. Electric motor controlling means for a soot blower system or the like adapted to be employed in combination with a plurality of power supply lines which extend to a control station and which also extend to a controlled electric motor located at a remote station, including a motor switching element actuatable to connect and disconnect the controlled motor with respect to said supply lines, actuating means for said switching element including an electromagnetic member having one terminal connected to one of said supply lines, a control conductor extending from another terminal of said electromagnetic member to the control station, a control switch at the control station in series with said control conductor and with another of said supply lines, a voltage reducing element in series with said control switch and said electromagnetic member, said electromagnetic member and motor switching element being located in the vicinity of the remote station, means located adjacent the controlled motor and operable thereby for disabling said voltage reducing element and control switch, means for controllingly actuating said control switch including another electromagnetically operable member located at said control station and connected to said conductor and to one of the supply lines, said last-mentioned electromagnetically operable member being operatively energizable only in response to energization thereof by the increased voltage supplied thereto in response to disabling of said voltage reducing element.

4. Means as set forth in claim 3 wherein said means for controllingly actuating said control switch comprises a sequential actuator, and latching means for holding said actuator in predetermined switch actuating position, said latching means being releasable in response to full energization of said last-mentioned electromagnetically operable member.

5. Means as set forth in claim 3 including a plurality of controlled motors each having one terminal connected to one of said feed lines, an independent motor switching element for each of said motors, a plurality of control switches at the control station including one for each of said controlled motors, one of said control conductors being provided for each remote station, one of said other electromagnetic members being provided for each of said control switches, a movable sequential actuator for successively actuating said several control switches, and means for controlling operative movement of said actuator including a latch mechanism for each of said control switches, operable by said other electromagnetic members and engageable with said actuator to prevent unwanted movement thereof.

6. Means as set forth in claim 3 including a plurality of controlled motors each having one terminal connected to one of said feed lines, an independent motor switching element for each of said motors, a plurality of control switches at the control station including one for each of said controlled motors, one of each control conductors being provided for each remote station, one of said other electromagnetic members being provided for each of said control switches, a movable sequential actuator for successively actuating said several control switches, and means for controlling operative movement of said actuator including a plurality of motion interrupting members, one for each of said control switches, said motion interrupting members being individually operatively connectable with said actuator to prevent unwanted movement thereof.

7. Means as set forth in claim 3 including a plurality of controlled motors each having one terminal connected to one of said feed lines, an independent motor switching element for each of said motors, a plurality of control switches at the control station including one for each of said controlled motors, one of said control conductors being provided for each remote station, one of said other electromagnetic members being provided for each of said control switches, a movable sequential actuator for successively actuating said several control switches, and means for controlling operative movement of said actuator including an electromagnetic element for each of said control switches, and a plurality of latching means one engageable with each of said actuators to prevent unwanted movement thereof, said latching means being individually releasable by said last-mentioned electromagnetic elements.

8. A sequence controlling and activating and deactivating system for a plurality of motor driven soot blowers, said system including a control station and a plurality of controlled stations, each controlled station including a driving motor for a soot blower, means for connecting power lines to the motors, a reduced-power control line connecting each controlled station to the control station, switching means at each controlled station operatively connected to the related control line leading to that controlled station, said switching means also being connected to a power line and to the motor, means responsive to actuation of the motor at each controlled station for actuating said switching means for the controlled station in question to connect the related control line for that controlled station to the power line to increase the power derivable from such related control line, and switching means at the control station actuatable by such increase of power in the control line.

CURTIS L. HOWSE.

No references cited.

Certificate of Correction

Patent No. 2,528,434                              October 31, 1950

CURTIS L. HOWSE

It is hereby certified that error appears in the printed specification of the above numbered patent requiring correction as follows:

Column 7, line 7, for the word "each" read *said*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*